(12) United States Patent
Haberl (10) Patent No.: US 10,266,157 B2
(45) Date of Patent: Apr. 23, 2019

(54) WASH APPARATUS FOR A VEHICLE WASH INSTALLATION AND VEHICLE WASH INSTALLATION

(71) Applicant: Alfred Kärcher GmbH & Co. KG, Winnenden (DE)

(72) Inventor: Bernd Haberl, Weissach im Tal (DE)

(73) Assignee: Alfred Kärcher SE & Co. KG, Winnenden (DE)

( * ) Notice: Subject to any disclaimer, the term of this patent is extended or adjusted under 35 U.S.C. 154(b) by 0 days.

(21) Appl. No.: 15/863,451

(22) Filed: Jan. 5, 2018

(65) Prior Publication Data

US 2018/0126961 A1    May 10, 2018

Related U.S. Application Data

(63) Continuation of application No. PCT/EP2016/064627, filed on Jun. 23, 2016.

(30) Foreign Application Priority Data

Jul. 8, 2015 (DE) .......................... 10 2015 111 023

(51) Int. Cl.
*B60S 3/06* (2006.01)
*A46B 13/00* (2006.01)
(Continued)

(52) U.S. Cl.
CPC ..................... *B60S 3/06* (2013.01); *A46B 7/10* (2013.01); *A46B 13/003* (2013.01); *A46B 13/005* (2013.01); *B60S 3/063* (2013.01); *F16H 1/32* (2013.01); *A46B 7/06* (2013.01); *A46B 2200/3046* (2013.01)

(58) Field of Classification Search
CPC .................................. B60S 3/06; B60S 3/063
See application file for complete search history.

(56) References Cited

U.S. PATENT DOCUMENTS

| 4,192,036 A | 3/1980 | Heymann |
| 4,320,551 A * | 3/1982 | Roncaglione ............. B60S 3/06 15/53.2 |
| 2007/0028406 A1 * | 2/2007 | MacNeil ................... B60S 3/06 15/53.2 |

FOREIGN PATENT DOCUMENTS

| DE | 10 2006 017 999 | 10/2007 |
| EP | 0 808 753 | 11/1997 |
| WO | WO 2007/072524 | 6/2007 |

* cited by examiner

*Primary Examiner* — Randall Chin
(74) *Attorney, Agent, or Firm* — Womble Bond Dickinson (US) LLP (57) ABSTRACT

A wash apparatus for a vehicle wash installation is provided, which includes a shaft drivable in rotation about a rotation axis and wash elements operatively connected thereto. In order to be able to adapt to the contour of a vehicle, the wash apparatus can be divided axially in two or more wash apparatus segments and that the at least one wash apparatus segment includes a wash element holding body having wash elements held thereto, said wash element holding body defining a wash apparatus segment axis which is different from the rotation axis, and a gear device which couples the shaft to the wash element holding body in order to rotate same about the wash apparatus segment axis, wherein the wash element holding body is configured for pivotal movement relative to the shaft via the gear device. Furthermore, a vehicle wash installation including a wash apparatus is provided.

36 Claims, 9 Drawing Sheets

(51) Int. Cl.
*A46B 7/10* (2006.01)
*F16H 1/32* (2006.01)
*A46B 7/06* (2006.01)

WASH APPARATUS FOR A VEHICLE WASH INSTALLATION AND VEHICLE WASH INSTALLATION

CROSS-REFERENCE TO RELATED APPLICATIONS

This application is a continuation patent application of international application number PCT/EP2016/064627, filed on Jun. 23, 2016, and claims the benefit of German application number DE 10 2015 111 023.7, filed Jul. 8, 2015, which are incorporated herein by reference in their entirety and for all purposes.

FIELD OF THE INVENTION

The present invention relates to a wash apparatus for a vehicle wash installation, which wash apparatus comprises a shaft drivable in rotation about a rotation axis and wash elements operatively connected thereto, for cleaning a vehicle.

Furthermore, the present invention relates to a vehicle wash installation, in particular for motor vehicles, comprising at least one wash apparatus.

BACKGROUND OF THE INVENTION

A wash apparatus of the kind mentioned at the outset is used in a vehicle wash installation which may be a gantry-type wash installation or a wash line. The wash apparatus can be utilized as a side wash apparatus for cleaning the vehicle's side areas or as a "roof" wash apparatus with which top side areas of the vehicle and in particular the roof thereof can be cleaned.

In practice, the problem exists that vehicles can have different contours and that there are difficulties in cleaning vehicles of different contours with the same quality. For example, sports cars have a flat contour that is often severely convex towards the sides, sedans have a medium-high, trapezoidal contour and large-sized sedans and minibuses have a contour that is rather rectangular. For adapting the wash apparatus to the contour of the vehicle, EP 0 012 683 A1 proposes to provide the shaft with a joint so that there exist two sections of the shaft which are angularly oriented to each other. But this has a drawback in that the wash elements are omitted in the area of the joint and the vehicle is only inadequately cleaned there. Moreover, for providing and maintaining the angulation, the shaft needs to be supported on both sides thereof and this requires considerable material and manufacturing expenditure.

A further wash apparatus comprising a shaft that can be angled is described in EP 0 808 753 A1. The wash apparatus comprises a hollow shaft which is rotatably supported on a core arranged inside. The core can be angled at a joint. Different segments of the hollow shaft are coupled via end-face-side teeth. The wash apparatus as described in EP 0 808 753 A1 has the disadvantage of a complex construction which is expensive from a manufacturing standpoint. Furthermore, adapting the wash apparatus to the vehicle contour is only possible to a certain degree.

DE 10 2006 017 999 A1 describes a wash apparatus with contour adaptation to the vehicle. In this publication, it is proposed that the wash elements, in the rotating condition of the shaft, form a concave contour across their free ends which approximately corresponds to the convex contour of vehicles. The manufacture of this wash apparatus involves high costs because different wash elements need to be kept in stock and mounted for different axial sections along the rotation axis.

WO 2007/072524 A1 describes a fastening mechanism based on form-locking engagement for fastening wash elements to the shaft.

An object underlying the present invention is to provide a wash apparatus of the kind mentioned at the outset and a vehicle wash installation, wherein the wash apparatus makes it possible to adapt to the contour of a vehicle in order to achieve a better cleaning thereof.

SUMMARY OF THE INVENTION

In a first aspect of the invention, a wash apparatus for a vehicle wash installation comprises a shaft drivable in rotation about a rotation axis and wash elements operatively connected thereto, for cleaning a vehicle. The wash apparatus is divided axially in two or more wash apparatus segments. At least one wash apparatus segment comprises a wash element holding body having wash elements held thereto, said wash element holding body defining a wash apparatus segment axis which is different from the rotation axis, and a gear device which couples the shaft to the wash element holding body in order to rotate same about the wash apparatus segment axis. The wash element holding body is configured for pivotal movement relative to the shaft via the gear device.

In a second aspect of the invention, a vehicle wash installation comprises at least one wash apparatus in accordance with the first aspect.

BRIEF DESCRIPTION OF THE DRAWINGS

The foregoing summary and the following description may be better understood in conjunction with the drawing figures, of which.

The following description of preferred embodiments of the invention serves to explain the invention in greater detail in conjunction with the drawing. In the drawings.

DETAILED DESCRIPTION OF PREFERRED EMBODIMENTS OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

The present invention relates to a wash apparatus for a vehicle wash installation, which wash apparatus comprises a shaft drivable in rotation about a rotation axis and wash elements operatively connected thereto, for cleaning a vehicle. The wash apparatus is divided axially in two or more wash apparatus segments. At least one wash apparatus segment comprises a wash element holding body having wash elements held thereto, said wash element holding body defining a wash apparatus segment axis which is different from the rotation axis, and a gear device which couples the shaft to the wash element holding body in order to rotate same about the wash apparatus segment axis. The wash element holding body is configured for pivotal movement relative to the shaft via the gear device.

The wash apparatus in accordance with the invention is divided axially in at least two wash apparatus segments, wherein "axial" and "radial", unless otherwise described, are to be taken to refer to the rotation axis defined by the shaft. At least one wash apparatus segment comprises a wash element holding body for holding the wash elements. The wash element holding body can be driven in rotation about the wash apparatus segment axis, for rotating the wash elements. The wash element holding body is driven eccentrically, wherein the wash apparatus segment axis and the rotation axis defined by the shaft are different from one another. The gear device is provided in order to translate a rotary movement of the shaft into a rotary movement of the wash element holding body. In addition, the gear device allows the wash element holding body in its condition of being driven in rotation to be pivoted relative to the shaft. By the eccentric arrangement of the shaft relative to the wash element holding body, it is thereby possible in particular to change a distance of the wash element holding body relative to the vehicle. For example, this allows the wash element holding body, by rotation on its own axis, i.e., about the wash apparatus segment axis, and pivoting relative to the shaft, to execute a superimposed movement and thereby to approach the vehicle when the latter has a relatively large distance from the wash apparatus or when the contour of the vehicle recedes. Conversely, the friction of the wash elements on the vehicle can be increased by a comparatively small distance of the vehicle from the wash apparatus or by the contour of the vehicle projecting theretowards. As a consequence, a torque is exerted on the wash element holding body and the wash element holding body, in its rotating condition, is pivoted for increasing the distance from the vehicle. This provides the possibility for the wash apparatus to adapt to the contour of a vehicle, at least in the area of the wash apparatus segment. The wash apparatus is thereby made versatile.

In particular, the wash element holding body is configured for pivotal movement relative to the shaft about the rotation axis via the gear device.

It is advantageous for each wash apparatus segment to comprise a wash element holding body and a gear device such as have been described above. Each wash apparatus segment is provided with a wash element holding body and a gear device in order to drive the wash element holding body in rotation about the respective wash apparatus segment axis relative to the shaft, wherein the wash element holding body is pivotable relative to the shaft via the gear device. This allows for an even more versatile adaptation of the wash apparatus to the contour of the vehicle.

It is particularly advantageous for the wash element holding bodies of the wash apparatus segments to be drivable and pivotable relative to the shaft independently of each other.

Preferably, the wash apparatus segments are of identical configuration in order to make for a simple construction of the wash apparatus and keep its manufacturing cost low.

In a concrete implementation of the wash apparatus in practice, it proves advantageous for the wash apparatus to comprise at least three wash apparatus segments, preferably four or more wash apparatus segments.

It is advantageous for the gear device to comprise a drive element that is connected to the shaft in rotationally fixed relation therewith and a rotary body to which the wash element holding body is held in rotationally fixed relation or which forms the wash element holding body, wherein the rotary body is in engagement with the drive element. The drive element is made to rotate about the rotation axis by driving the shaft. Via the existing engagement with the rotary body, the rotary body is rotated about the wash apparatus segment axis, for rotating the wash elements.

Preferably, the rotary body is an internally toothed ring gear and the drive element is a toothed wheel meshing with the ring gear.

In a different advantageous embodiment, it is advantageous for the rotary body to be a ring gear and for the drive element to be a roller that rolls on the inside of the ring gear.

Preferably, the gear device comprises at least one cover body which at least partially covers the rotary body and the drive element in a direction transverse to the wash apparatus segment axis. The cover body at least partially covers the rotary body and the drive element in a plane transverse and perpendicular to the wash apparatus segment axis. The gear device can thereby be protected at least partially against the ingress of dirt and cleaning liquid.

It is understood that the at least one cover body can comprise a recess or a through-opening through which the shaft passes.

It is advantageous for the gear device to comprise two cover bodies which are arranged axially on sides of the rotary body and the drive element facing away from each other. The cover bodies can be axially spaced apart from one another, wherein the rotary body and the drive element are positioned therebetween. This affords the possibility of the rotary body and the drive element to be covered, at least partially, on both sides.

Advantageously, the two cover bodies are of identical configuration.

It is advantageous for the at least one cover body to be plate-shaped or substantially plate-shaped.

It proves advantageous for the at least one cover body to be configured for rotary movement relative to the shaft. The mass moved by the shaft can thereby be kept low in order to keep the load on the shaft as low as possible.

Preferably, the gear device comprises a bearing via which the at least one cover body is rotatably supported on the shaft. For example, a bearing element is provided that forms a sliding bearing.

Advantageously, the at least one cover body is coupled to the rotary body in friction-locking relation therewith for rotation about the wash apparatus segment axis.

In particular in combination with the last-mentioned advantageous embodiment, it is advantageous for the at least one cover body to be configured for rotary movement relative to the rotary body, wherein the gear device preferably comprises a bearing via which the at least one cover body is rotatably supported on the rotary body. Such an embodiment proves advantageous for example when, as will be explained in more detail later, the at least one cover body comprises or forms a stop element in order to limit pivoting of the rotary body relative to the shaft. By virtue of the rotationally movable coupling and the in particular rotatable support, it is possible on the one hand to ensure that the at least one cover body does not rotate about the wash apparatus segment axis at the same rotational speed as does the rotary body. The rotated mass can thereby be kept low. By virtue of the force-locking coupling, it is possible on the other hand for the at least one cover body to follow the rotary body at a comparatively low rotational speed, wherein it can be ensured via the at least one stop element that the rotary body can be pivoted relative to the shaft only within predetermined limits.

The bearing is configured as or comprises, for example, a bearing ring which is arranged between end faces of the rotary body and the at least one cover body facing towards each other.

The wash element holding body surrounds in particular the gear device in a circumferential direction of the wash apparatus segment axis. For example, the wash element holding body is of a cylindrical contour and is formed in the shape of a core of a cable or hose reel. The fill of wash elements is fixed to the wash element holding body on the radially outer side thereof relative to the wash apparatus segment axis. On the radially inner side, the rotary body, for example the above-mentioned ring gear, can be connected to the wash element holding body in rotationally fixed relation therewith.

Preferably, the gear device comprises at least one engagement element configured as a toothed wheel or roller which rolls on the ring gear and at least one coupling body on which is rotatably supported at least one engagement element and which is supported for rotary movement on the shaft. Via the at least one engagement element, the ring gear can be provided with support in addition to that provided on the drive element in order to make the rotation of the ring gear about the wash apparatus segment axis reliable. Via the at least one coupling body, support of the at least one engagement element can be assured. Bearings can be provided for supporting in a rotationally movable manner the coupling body on the shaft or the engagement element on the coupling element.

Advantageously, two engagement elements are provided, each of which is rotatably supported on at least one coupling body. It is thereby possible for example to implement a three-point mounting or support of the ring gear on the drive element and the two engagement elements.

It is advantageous for two coupling bodies to be provided that are axially arranged on sides of the rotary body and the at least one engagement element facing away from each other. The ring gear and the drive element as well as the engagement elements are arranged between the coupling bodies.

It proves advantageous for the at least one cover body of the gear device to comprise or form the at least one coupling body. This enables a simple structure and at the same time a compact construction of the gear device. The at least one cover body allows the ring gear and the drive element and the at least one engagement element to be covered, wherein the engagement element can at the same time be supported on the cover body.

Preferably, the wash apparatus segment comprises a stop device for limiting a pivot angle of the wash element holding body relative to the shaft in at least one pivoting direction. Via the stop device, it is thus possible to predetermine which range of distance the wash element holding body can assume relative to the vehicle, wherein the range of distance is limited in at least one direction. It is thereby possible to predetermine the extent to which the wash apparatus segment can follow the contour of the vehicle.

It is advantageous for the stop device to comprise at least one stop element which is configured for rotary movement relative to the rotary body and is coupled to the rotary body by friction-locking engagement, and at least one blocking element cooperating with the at least one stop element, said blocking element being arranged stationary relative to the shaft. The at least one stop element is rotationally movable relative to the rotary body so that when the rotary body is driven, the wash elements can be made to rotate. Furthermore, the at least one stop element is coupled to the rotary body by friction-locking engagement, whereby the stop element can also be pivoted relative to the shaft. This affords the possibility for the at least one stop element to limit pivoting of the rotary body relative to the shaft and, at the same time, not to interfere with the rotation of the rotary body about the wash apparatus segment axis. The at least one blocking element is of stationary and in particular fixably movable configuration relative to the shaft. The at least one blocking element serves as a counter-stop which may be held to, for example, a holding device of a wash gantry or of the wash line.

Advantageously, the stop device comprises two stop elements, wherein pivoting of the wash element holding body in a respective pivoting direction can be limited by a respective stop element.

In an advantageous implementation of the wash apparatus, it proves advantageous for the wash element holding body to be pivotable through 180° or substantially 180° relative to the shaft, wherein the pivotal movement in the pivoting directions opposite each other is in each case limited by a stop element.

Preferably, depending on the pivoting direction, the same blocking element cooperates with a respective one of the two stop elements, for limiting the pivot angle. In particular, only one blocking element is provided which cooperates with one of the two stop elements depending on the pivoting direction.

It proves advantageous for the stop device to comprise a stop body which comprises both of the stop elements. The structural configuration of the wash apparatus can thereby be simplified.

Advantageously, two stop bodies are provided which are arranged on sides of the rotary body and the drive element facing away from each other.

Advantageously, the stop body can comprise or form a guide element through which the at least one blocking element is guided when pivoting the wash element holding body. The guide element is for example an arc-shaped recess or through-opening and is in particular a through-hole of the stop body in which the at least one blocking element engages or through which the at least one blocking element passes.

It has already been mentioned that a plurality of wash apparatus segments can be provided, comprising a gear device and a wash element holding body pivotable relative to the shaft. A respective wash apparatus segment can comprise a stop device. It is advantageous for a common blocking element to be provided that cooperates with the respective at least one stop element of two or more wash apparatus segments.

As has already been mentioned, the at least one blocking element can be fixably movable relative to the shaft. In particular, the at least one blocking element can be adjustable relative to the at least one stop element by way of an adjustment device. This permits the pivot angle about which the wash element holding body is pivotable relative to the shaft to be adjusted.

The at least one blocking element is preferably elongated and is oriented parallel to the shaft. By way of example, the at least one blocking element is configured as a tube, bar, profile or the like.

The at least one stop element, in particular the stop body, is preferably rotatably supported on the rotary body via a bearing.

The bearing is or comprises for example a bearing ring which is arranged between end faces, facing towards each other, of the rotary body and of the at least one stop element or the stop body.

It is particularly advantageous for the at least one cover body of the gear device to comprise or form the at least one stop body. This permits the structural configuration of the wash apparatus to be simplified.

In a different advantageous embodiment of the wash apparatus, it is advantageous for the wash element holding body to be pivotable relative to the shaft against the action of at least one elastic element. For example, the wash element holding body can pivot relative to the shaft when the contour of the vehicle approaches. When the contour of the vehicle recedes, pivoting in the counter-direction can be assured under the action of the at least one elastic element.

The at least one elastic element may for example be a spring element which biases the at least one stop element, in particular the stop body, relative to the at least one blocking element. The spring element is for example a tension spring which engages the stop body and the at least one blocking element.

In an advantageous embodiment, the shaft is of rigid configuration and straight-line extension.

The shaft may be configured as a hollow shaft or it may be made of solid material.

The wash elements may be wash bristles or wash cloths. As used herein, wash cloths are taken to be sheet or strip-like wash elements.

The wash apparatus may be a side wash apparatus, in particular a side brush, or a roof wash apparatus, in particular a roof brush.

As mentioned, the present invention also relates to a vehicle wash installation. A vehicle wash installation in accordance with the invention comprises at least one wash apparatus of the kind mentioned in the foregoing. The advantages that have already been mentioned in conjunction with the description of the wash apparatus in accordance with the invention can also be achieved with the vehicle wash installation. In this respect, reference can be made to the above statements.

Advantageous embodiments of the vehicle wash installation are apparent from advantageous embodiments of the wash apparatus in accordance with the invention.

Figure 1:
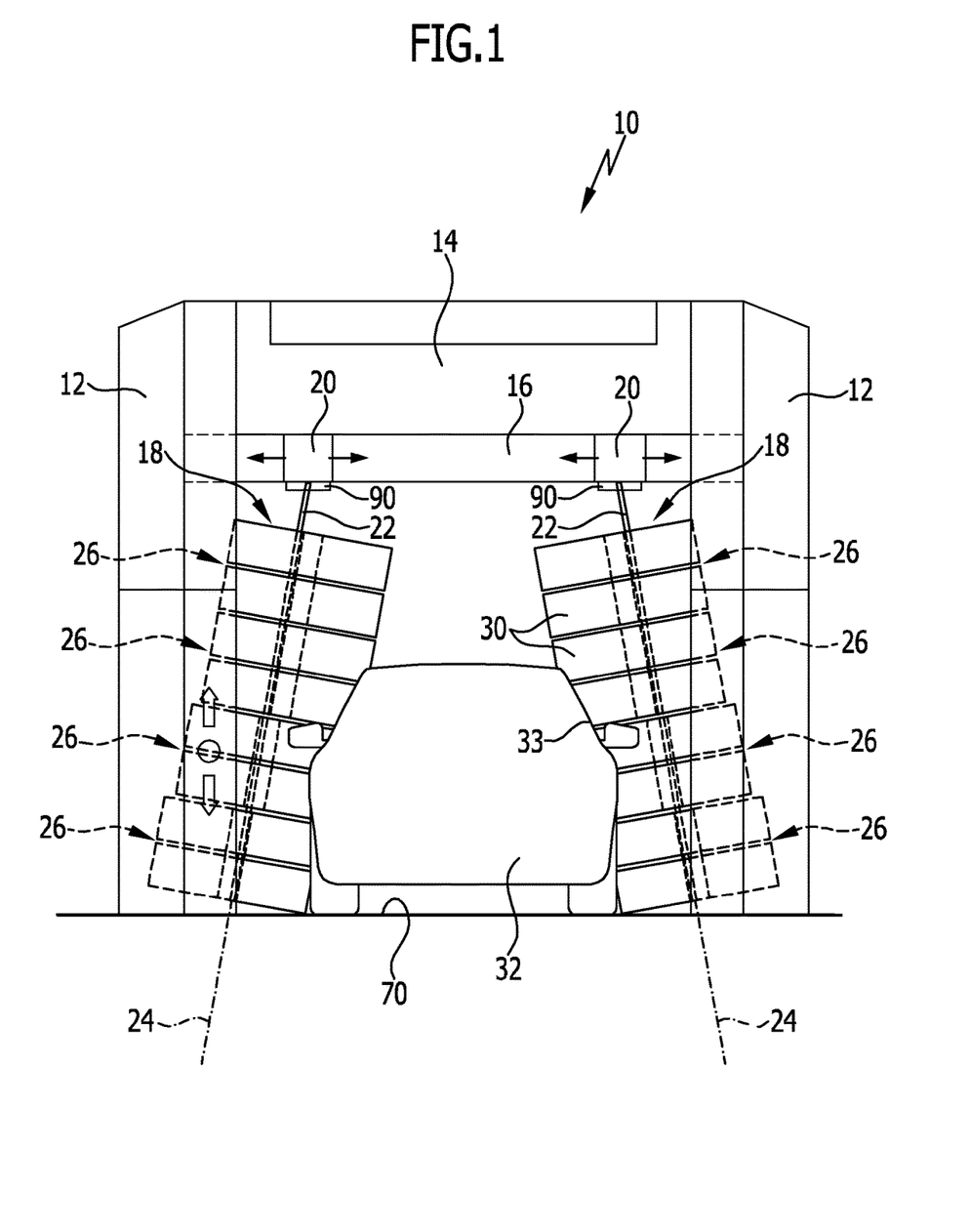
FIG. 1 illustrates a schematic view of a vehicle wash installation in accordance with the invention, configured as a gantry-type wash installation, comprising a wash apparatus in accordance with the invention having a plurality of wash apparatus segments, shown in the process of cleaning a small car.
Figure 2:
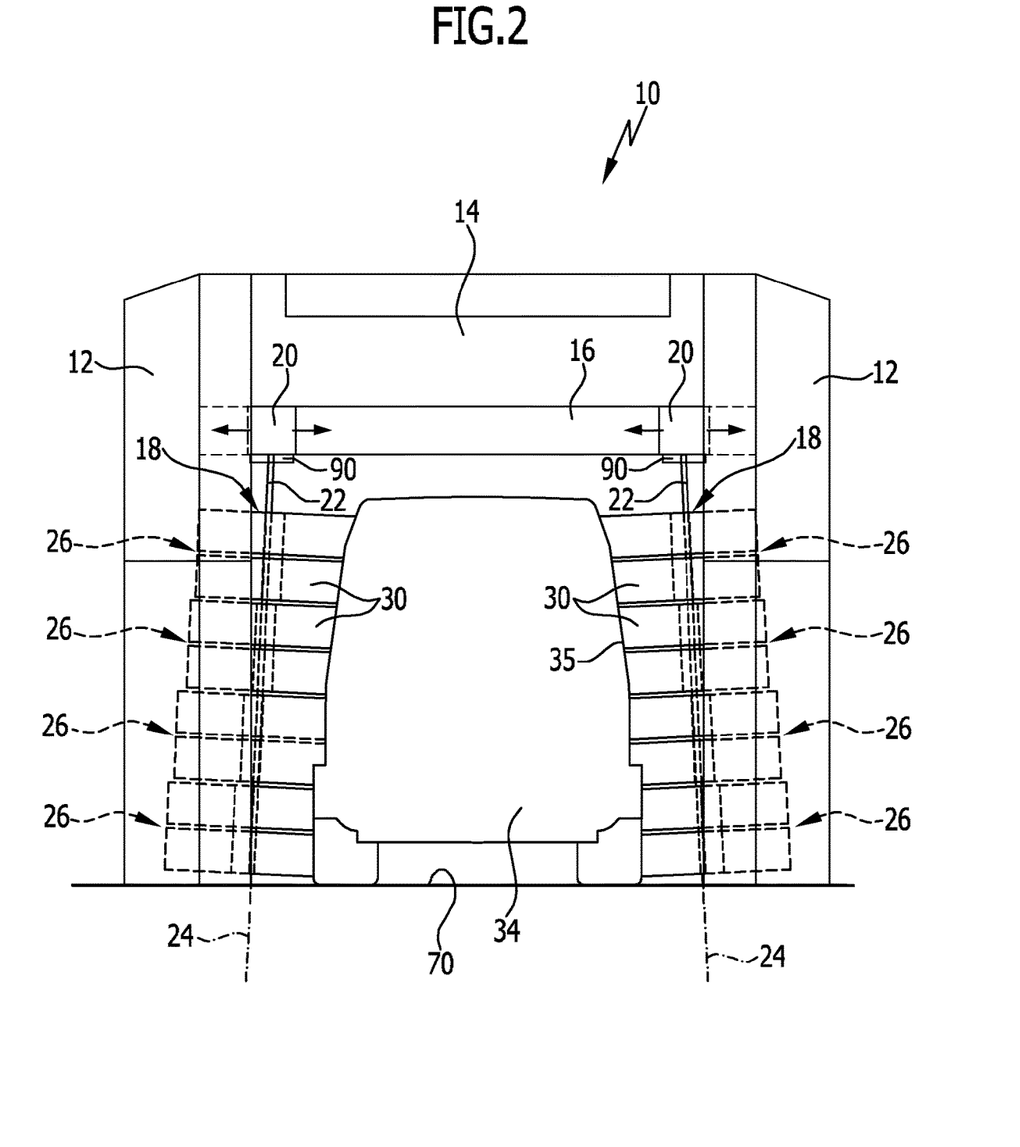
FIG. 2 shows the vehicle wash installation of FIG. 1 in the process of cleaning a minibus.

FIGS. 1 and 2 show a schematic representation of an advantageous embodiment of a vehicle wash installation in accordance with the invention, designated by the reference numeral 10. The vehicle wash installation 10 is configured as a gantry-type wash installation and comprises side beams 12 and a cross beam 14 interconnecting same. Advantageous embodiments of a wash apparatus 18 in accordance with the invention are movably held to the wash gantry via a holding device 16.

The wash apparatus 18 can be driven in rotation by a drive device 20 fixed to the holding device 16. To this end, the wash apparatus 18 comprises a shaft 22. The shaft 22 defines a rotation axis 24.

The wash apparatus 18 comprises a plurality of wash apparatus segments 26 arranged axially next to each other. The construction and operation of the respective wash apparatus segments 26 is described in the following. In the present case, four wash apparatus segments 26 are provided which are in particular of identical configuration.

Each wash apparatus segment 26 comprises a wash element holding body 28 having wash elements 30 fixed thereto (FIG. 3), wherein the respective wash element holding body 28 is pivotable about the drive axis 24 relative to the shaft 22 as explained in the following. This permits the wash element holding bodies 28 of the plurality of wash apparatus segments 26 to be pivoted independently of each other at the respective axial position on the shaft 22. In this way, the wash element holding bodies 28 and the wash elements 30 held thereto can be brought to different distances relative to vehicles that are to be cleaned.

This is explained in FIG. 1 using the example of a small car 32 and in FIG. 2 using the example of a minibus 34. The wash apparatus 18 can thereby adapt to the contours 33 and 35 of the small car and minibus respectively. By the use of the wash apparatus 18 in accordance with the invention, it is thereby possible to achieve a better cleaning of vehicles, including those of different contours.

The drawing shows the wash apparatus 18 as being a side wash apparatus for cleaning side areas of the vehicles. It is, of course, also possible within the scope of the invention for a wash apparatus in accordance with the invention to be configured as a roof wash apparatus for cleaning a top side of the vehicles.

The wash elements 30 may be wash bristles or they may be wash cloths—sheet or strip-like wash elements of elongated configuration.

Figure 3:
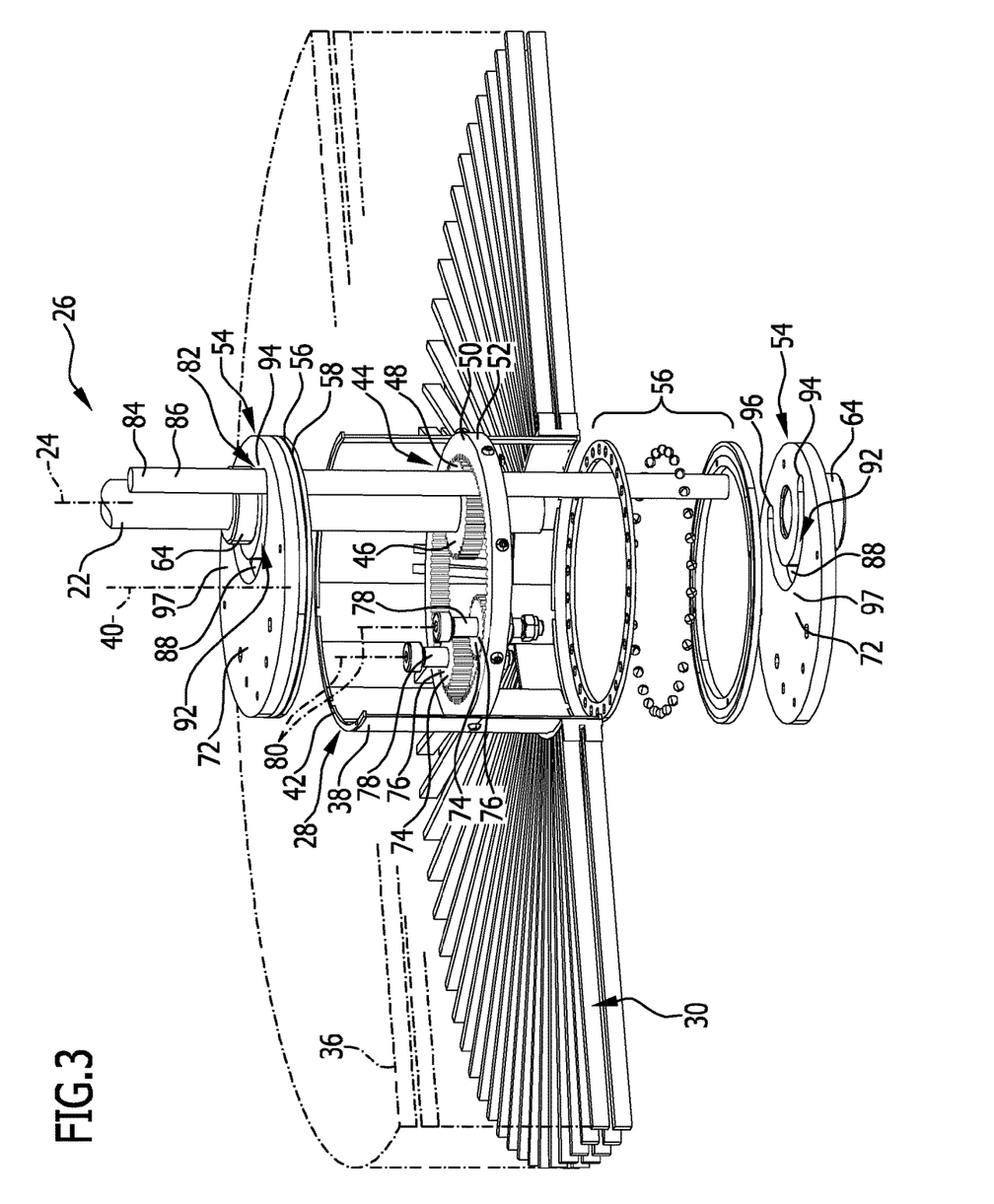
FIG. 3 shows an enlarged perspective (partial) view, partially presented as an exploded view, of a wash apparatus segment of the wash apparatus of FIG. 1.
Figure 4:
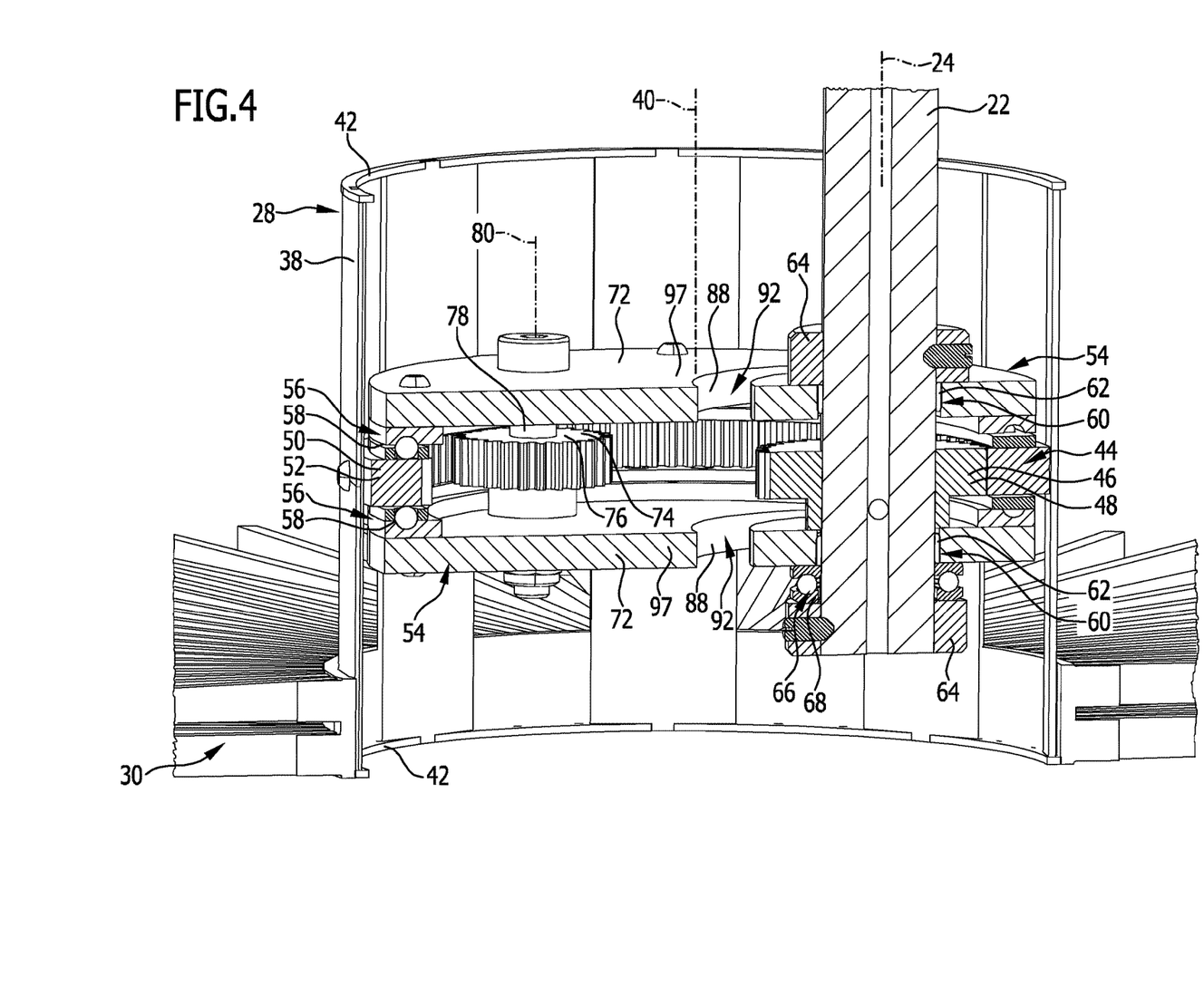
FIG. 4 shows a sectional (partial view) of the wash apparatus segment.

FIGS. 3 and 4 illustrate the construction of the respective wash apparatus segments using the example of a wash apparatus segment 26, same being only partially depicted in each case. For clarity of illustration, the fill of wash elements 30 is only partially shown. The representation of the wash elements 30 is limited to a collection of wash elements 30 that define a plane relative to the rotation axis 24. Broken contour lines 36 symbolize further rows of wash elements 30 held to the wash element holding body 28 and arranged axially next to each other.

Furthermore, in FIGS. 3 and 4, the wash element holding body 28 and the wash elements 30 are shown as extending over only half the circumference of the wash apparatus segment 26 to permit a view of the internal construction of the wash apparatus segment 26. It is shown in FIGS. 1, 2 and 5 to 8 that the wash element holding body 28 and the wash elements 30 extend over the whole circumference of the wash apparatus segment 26.

The wash element holding body 28 is of a cylindrical shape and comprises a shell 38. The wash element holding body 28 defines a wash apparatus segment axis 40.

The shell 38 can be partially broken in the circumferential direction of the wash apparatus segment axis 40, such as shown for the wash apparatus 18. Accordingly, the shell 38 can be formed of a plurality of shell segments spaced apart from one another in a circumferential direction and connected together in an axial direction (in relation to the wash apparatus segment axis 40) by way of two collars 42. The wash elements 30 are fixed to the shell 38 on the radially outer side thereof. To this end, continuous connecting elements can be provided in a circumferential direction of the wash apparatus segment axis 40.

On the radially inner side of the shell 38, the wash apparatus segment 26 comprises a gear device 44. The gear device 44 comprises a drive element 46 which is held to the shaft 22 in rotationally fixed relation. The drive element 46 in the present case is a toothed wheel 48.

The gear device 44 further comprises a rotary body 50, which in the present case is configured as an internally toothed ring gear 52. The rotary body 50 is aligned coaxially with the wash element holding body 28 and is connected thereto in a rotationally fixed manner, such as by screwing.

The wash apparatus segment axis 40 is oriented parallel to the rotation axis 24; thus, in the present case, the two axes are in particular different from one another.

When the shaft 22 rotates about the rotation axis 24, the toothed wheel 48 meshes with the ring gear 52. The ring gear 52, and consequently the wash element holding body 28, is thereby eccentrically driven via the shaft 22. The ring gear 52, and consequently the wash element holding body 28, can thereby perform a rotary movement for rotating the wash elements 30 about the wash apparatus segment axis 40. Under rotation of the wash elements 30, the vehicle can be cleaned (this will be explained hereinafter using the example of the small car 32 and the contour 33 thereof).

Even while in its condition of being driven in rotation, under the rotation of the shaft 22 about the rotation axis 24, the ring gear 52 and hence the wash element holding body 28 can also perform a pivotal movement relative to the shaft 22. The wash element holding body 28 can thereby pivot relative to the shaft 22 about the rotation axis 24.

It is possible for the wash element holding body 28 to be pivoted in either pivoting direction independently of the direction of rotation of the shaft 22, wherein in the present case the pivot angle is limited by a stop device as described below. The wash element holding body 28 can thereby execute a superimposed movement with respect to the shaft 22, namely rotational motion about the wash apparatus segment axis 40 and pivotal motion about the rotation axis 24.

It is already clear from what has been described above that, with the shaft 22 assumed to be stationary, the wash element holding body 28 can have a different distance from the vehicle 32 depending on the pivot angle relative to the shaft 22 it assumes in each case. As a consequence of this, the wash elements 30 also have a different distance from the vehicle. This permits the contour of the wash apparatus 18 at a respective wash apparatus segment 26 to adapt to the contour 33 of the vehicle 32.

In the present case, "pivoting the wash element holding body 28" can also be understood to mean "pivoting the wash apparatus segment 26".

The gear device 44 comprises two cover bodies 54. The cover bodies 54 in the present case are of identical configuration and permit the ring gear 52 and the drive element 46 to be axially covered from sides facing away from each other, i.e., the cover bodies 54 are arranged axially on different sides of the ring gear 52 and the toothed wheel 48. The cover bodies 54 are oriented in a direction transverse to the orientation of the rotation axis 24 and the wash apparatus segment axis 40.

In the present case, the cover bodies 54 are of substantially plate-shaped configuration. Furthermore, the cover bodies 54 have a substantially disk-shaped configuration. The diameter of the cover bodies 54 is substantially equal to the diameter of the ring gear 52 in order substantially completely to cover the space enclosed by the ring gear 52.

Arranged between end faces, facing towards each other, of the ring gear 52 on the one hand and the cover bodies 54 on the other hand is in each case a bearing 56. The bearing 56 is configured as a bearing ring 58 which comprises a ball bearing in particular. Via the bearing ring 58, the cover bodies 54 are configured for rotary movement relative to the ring gear 52. However, the bearing friction enables a friction-locking engagement between the cover bodies 54 on the one hand and the ring gear 52 on the other, which friction-locking engagement is advantageous for operation of the wash apparatus segment 26.

The cover bodies 54 are supported for rotary movement on the shaft 22. A respective bearing 60 in the form of a sliding bearing 62 is arranged between each cover body 54 and the shaft 22 (FIG. 4).

Holding elements 64 are in each case arranged at the sides of the cover bodies 54 facing away from the ring gear 52. The holding elements 64 are connected to the shaft 22 in rotationally fixed relation therewith in order to prevent axial movement of the cover bodies 54 along the rotation axis 24.

Preferably, a bearing 66 is arranged between at least one holding element 64 and the cover body 54 facing towards the latter in order to reduce friction between the holding element 64 and the cover body 54. The bearing 66 in the present case is configured as a bearing ring, in particular a ball bearing, at the lower one of the cover bodies 54. Here, "lower" is taken to refer to the cover body 54 that faces towards a support surface 70 for the vehicle 32 when the wash apparatus 18 is in its intended use. The weight of the wash apparatus segment 26 can thereby be transferred to the bearing ring 68.

The cover bodies 54 each form a coupling body 72 of the gear device 44. Via the coupling body 72, at least one engagement element 74 is coupled to the shaft 22, for supporting the rotary body 50.

In the present case, two engagement elements 74 are provided which are configured as toothed wheels 76. The toothed wheels 76 are in engagement with the ring gear 52. Upon rotation of the shaft 22, the toothed wheels 76 as well as the toothed wheel 48 will rotate and mesh with the ring gear 52. Each toothed wheel 76 is supported for rotary movement on the two cover bodies 54 via a shaft 78, wherein rotation axes 80 defined by the shafts 78 are oriented parallel to the rotation axis 24 and the wash apparatus segment axis 40. Via the toothed wheels 76, it is possible to ensure that the plane of rotation of the ring gear 52 is maintained perpendicular to the rotation axis 24.

The wash apparatus segment 26 further comprises a stop device 82 in order to limit the pivotal action of the wash element holding body 28 relative to the shaft 22. The stop device 82 comprises a blocking element 84. The blocking element 84 is configured as a tube or rod 86 and is oriented parallel to the rotation axis 24.

The rod 86 is arranged stationary with respect to the shaft 22 but is fixably adjustable relative thereto as will be explained hereinafter. The rod 86 passes through a through-opening 88 of the cover bodies 54 and passes through the space of the gear device 44 enclosed by the ring gear 52.

In the present case, the rod 86 is associated with all of the wash apparatus segments 26 and the rod 86 preferably extends the whole or substantially the whole length of the shaft 22.

An adjustment device 90 is provided for the rod 86. For example, the adjustment device 90 may be integrated in or arranged on the drive device 20. Via the adjustment device 90, it is rendered possible for the position of the rod 86 to be changed relative to the shaft 22 by pivoting it about the rotation axis 24. In the present case, it is in particular possible for the rod 86 to be pivoted about the shaft 22 through a pivot angle of 180° or substantially 180°. Using the adjustment device 90, the rod 86 can be fixed after pivoting so that it is arranged stationary with respect to the shaft 22. The rod 86 is shown in FIGS. 3 and 5 to 8 only and is shown in the same stationary position with respect to the shaft 22 in each case.

Figure 5:
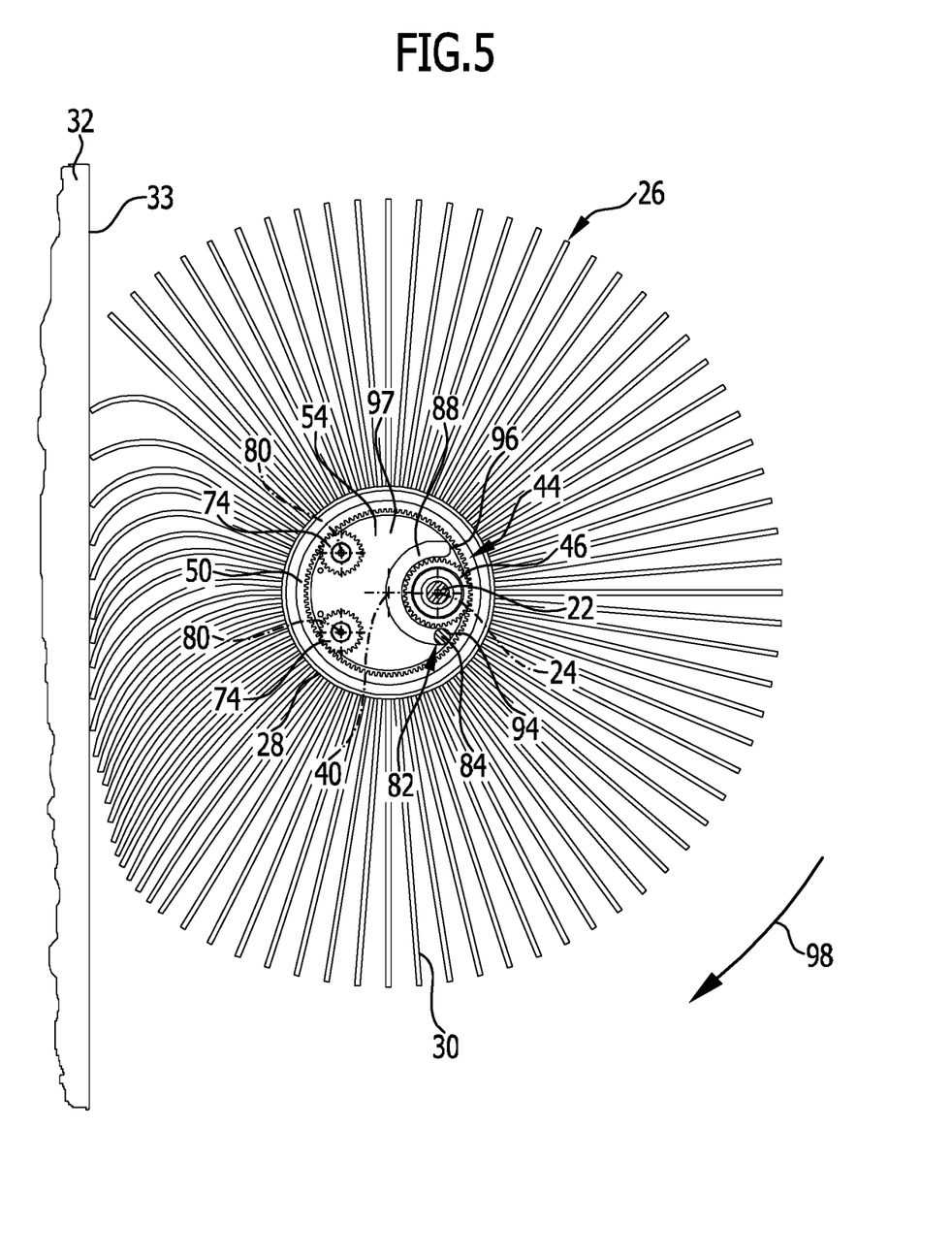
FIG. 5 shows a top view in an axial direction of the wash apparatus segment, with the wash apparatus segment being only partially shown and wash elements of the wash apparatus segment contacting a vehicle (schematically indicated) for cleaning.

The through-opening 88 forms a guide element 92 for the rod 86 when the latter pivots about the shaft 22 and when the cover bodies 54 pivot about the shaft 22. The through-openings 88 are in the form of arc-shaped through-holes of the cover bodies 54 whose ends form respective stop elements 94 and 96 for the rod. The stop elements 94, 96 are part of the stop device 82. FIGS. 3 and 5 show the rod 86 in the act of cooperating with the stop element 94.

By way of the stop elements 94, 96, the cover bodies 54 each form a stop body 97 of the stop device 82.

Operation of the wash apparatus 18 in accordance with the invention is explained hereinafter with particular reference to FIGS. 5 to 8, using a wash apparatus segment 26. FIGS. 5 to 8 show the wash apparatus segment 26 when viewed in an axial direction and with one cover body 54 omitted in order to provide a view of the interior of the gear device 44.

As has already been mentioned, the shaft 22 and the rod 86 are assumed to be stationary relative to each other. The vehicle 32 is indicated via its contour 33 at different distances from the shaft 22. Said different distances occur for example by the wash apparatus 18 being moved in a direction towards the vehicle 32. Conversely, it could be assumed that the contour 33 of the vehicle 32 increasingly projects in a direction towards the shaft 22. The distance of the vehicle 32 from the shaft 22 is reduced continuously in FIGS. 5, 6, 7 and 8.

In FIGS. 5 to 8, the shaft 22 is shown as being turned clockwise; however, this could be reversed. As a result of the shaft rotating clockwise about the rotation axis 24, the ring gear 52 and hence the wash element holding body 28 is given rotation about the wash apparatus segment axis 40 in a clockwise direction. The same applies analogously to the wash elements 30. The direction of rotation is symbolized by the direction of arrow 98.

Via the adjustment device 90, the rod 86 is adjusted with respect to the stop body 97 such that the rod 86 cooperates with the stop element 94. Because the shaft 22 is driven, the wash element holding body 28 rotates. Via the friction-locking engagement, the cover bodies 54 also have a tendency to rotate about the wash apparatus segment axis 40. However, a rotation of the cover bodies 54 is prevented as a result of the rod 86 cooperating with the stop element 94.

Under the rotation of the wash element holding body 28, the vehicle 32 can be cleaned with the wash elements 30, wherein the orientation of the gear device 44 with respect to the vehicle 32 is retained because of the stop device 82.

Figure 6:
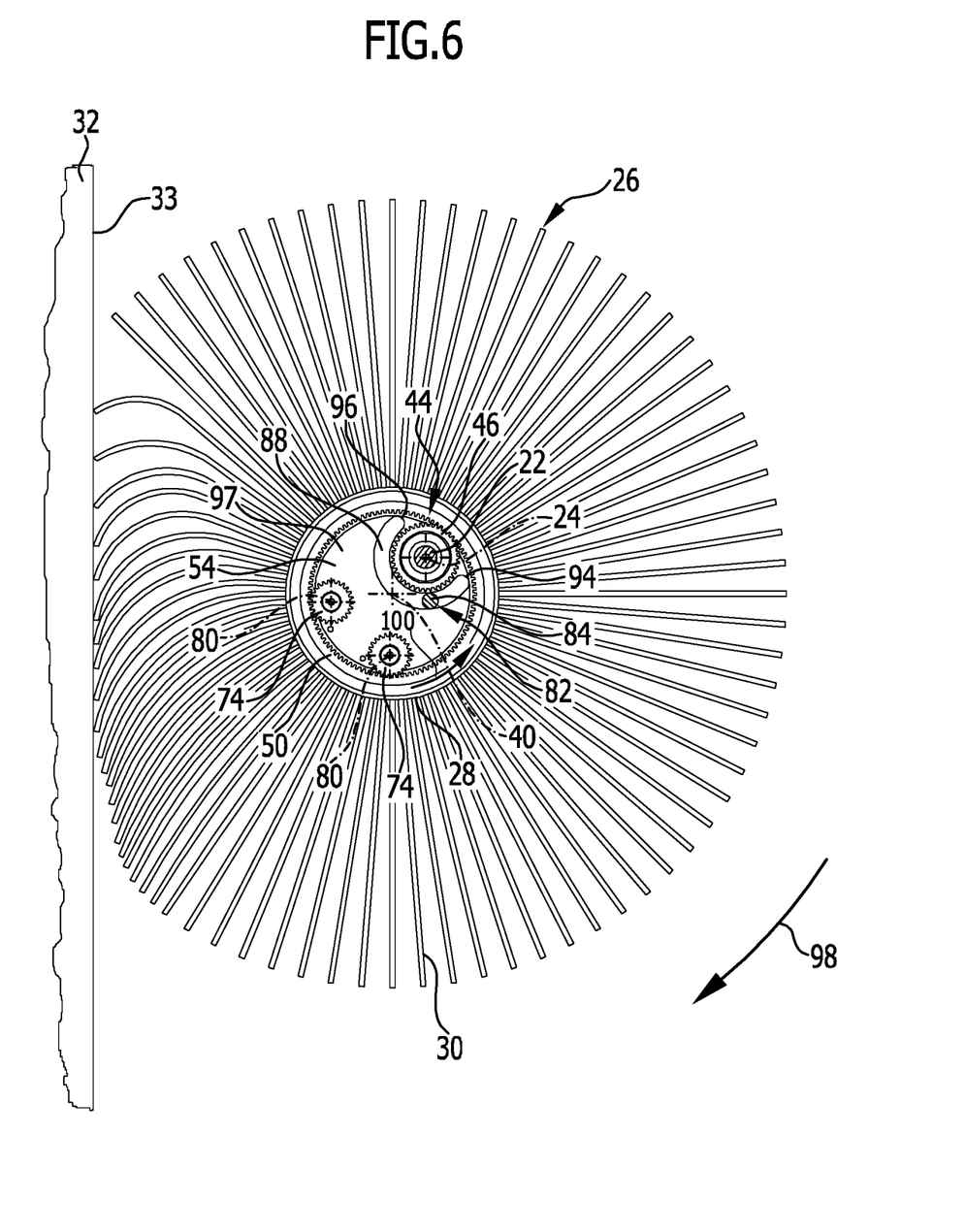
FIG. 6 is a view corresponding to FIG. 5, showing a distance of the vehicle from a shaft of the wash apparatus as having been reduced and the wash apparatus segment as having been pivoted relative to the shaft.

FIG. 6 shows the situation where the distance between the shaft 22 and the vehicle 32 is reduced as compared with the situation depicted in FIG. 5. This leads to increased friction of the wash elements 30 on the vehicle 32. As a result, the wash element holding body 28 and the ring gear 52 experience a torque. This causes the wash element holding body 28 and the ring gear 52 to pivot about the rotation axis 24 relative to the shaft 22, this being symbolized by an arrow 100. The pivoting direction 100 is opposite to the direction of rotation 98 of the ring gear 52 and the wash element holding body 28. The rotation of same about the wash apparatus segment axis 40 in the direction of arrow 98 is maintained.

Figure 7:
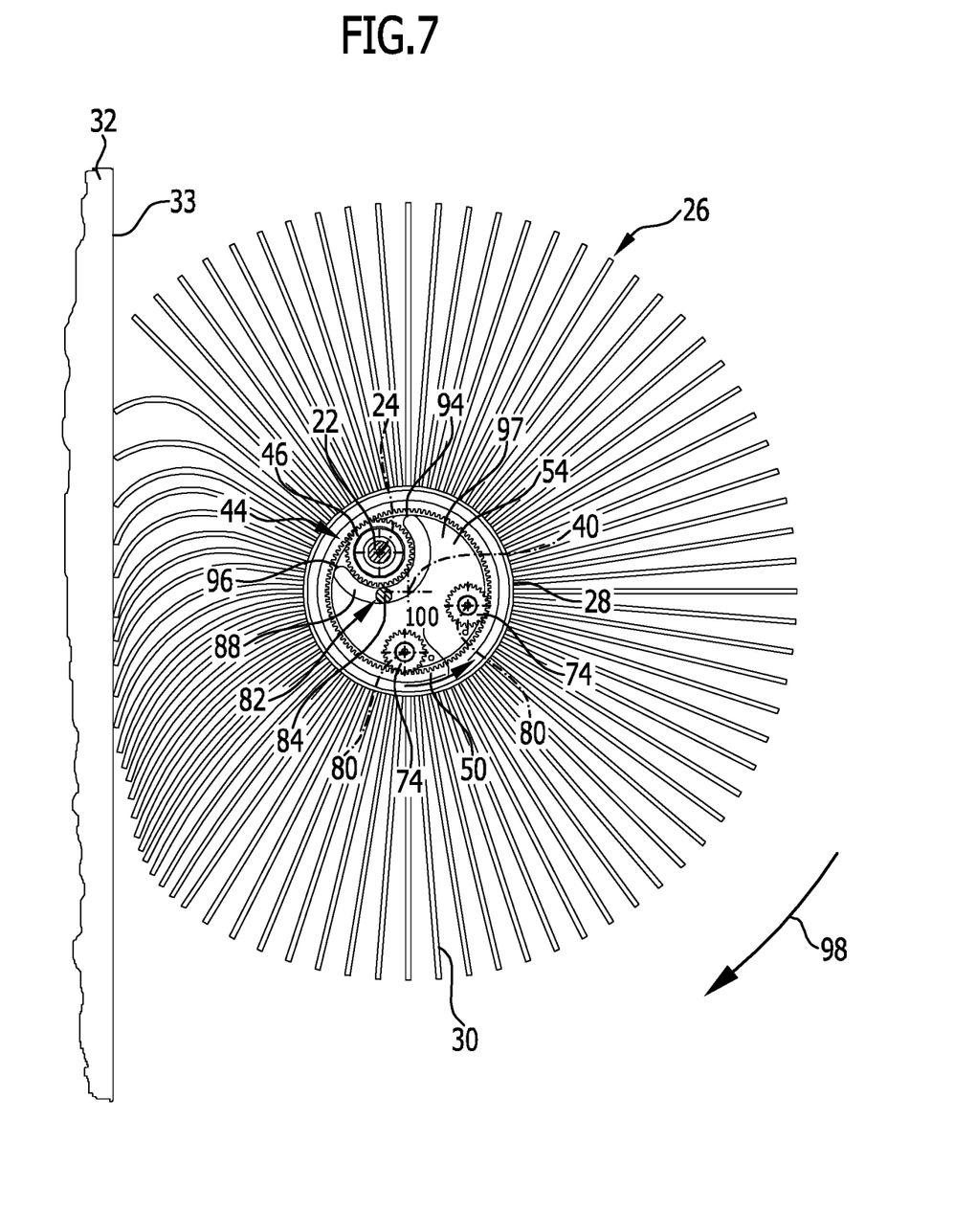
FIG. 7 is a view corresponding to FIG. 5, showing a distance of the vehicle from a shaft of the wash apparatus as having been reduced further and the wash apparatus segment as having been pivoted further relative to the shaft.

In the situation illustrated in FIG. 7, the distance of the vehicle 32 from the shaft 22 has been reduced further. Driven by the shaft 22, the wash element holding body 28 and the ring gear 52 continue to rotate in the direction of arrow 98. Because of the friction of the wash elements 30, the wash element holding body 28 along with the ring gear 52 continues to pivot about the rotation axis 24 relative to the shaft 22 in the direction of arrow 100.

Figure 8:
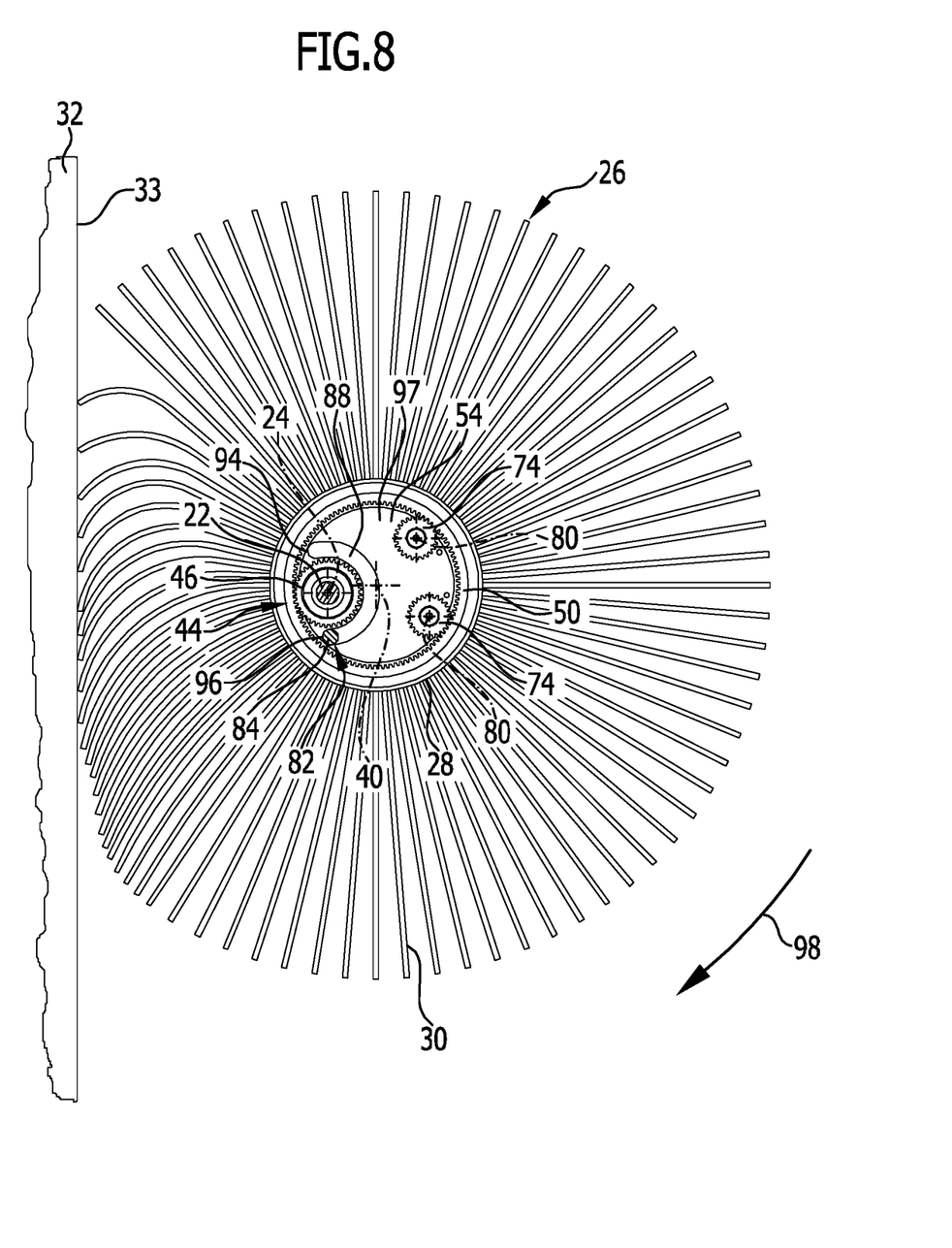
FIG. 8 is a view corresponding to FIG. 5, showing a distance of the vehicle from a shaft of the wash apparatus as having been reduced still further and the wash apparatus segment as having been pivoted still further relative to the shaft.

The same applies analogously to the situation shown in FIG. 8 where the distance of the vehicle 32 from the shaft 22 is reduced still further. The wash element holding body 28 and the ring gear 52 are driven in rotation via the shaft 22 in the direction of arrow 98. The friction of the wash elements 30 causes further pivoting of the wash element holding body 28 and the ring gear 52 about the rotation axis 24 relative to the shaft 22.

In the situation illustrated in FIG. 8, the wash element holding body 28 has been pivoted as far as possible relative to the shaft 22. The pivot angle is limited by the rod 86 and the stop element 96 cooperating therewith.

The present description shows that the wash apparatus segment 26 is pivoted relative to the shaft 22 depending on the relative position of the vehicle 32 and the contour 33 thereof. In other words, the position of the wash apparatus segment 26 can thereby be adapted to the contour 33. Because the wash apparatus 18 comprises a plurality of wash apparatus segments 26 that can be driven and pivoted independently of each other, the wash apparatus 18 permits adapting to the contour 33 of the vehicle 32 in a particularly reliable and versatile manner.

When, in the situations illustrated in FIGS. 6, 7 and 8, the distance between the vehicle 32 and the shaft 22 increases again, the following will happen:

By the reduction of the torque as a result of reduced friction of the wash elements 30 against the vehicle 32, the ring gear 52 can again execute a superimposed movement in which a rotational motion about the wash apparatus segment axis 40 in the direction of arrow 98 and a pivotal motion about the rotation axis 24 relative to the shaft is carried out. The wash element holding body 28 together with the ring gear 52 pivots in opposition to the direction of arrow 100, i.e., in the direction of arrow 98.

The friction-locking coupling of the ring gear 52 and the cover bodies 54 leads to these also being imparted rotational motion about the wash apparatus segment axis 40 in the direction of arrow 98. Rotation is continued until the rod 86 again cooperates with the stop element 94, for limiting the pivot angle, corresponding to the situation illustrated in FIG. 5.

If the direction of rotation of the wash apparatus 18 is to be reversed, i.e., counterclockwise in place of clockwise in the present exemplary embodiment, the rod 86 can first be pivoted about the shaft 22 within the guide element 92 by way of the adjustment device 90. For example, the rod 86 is pivoted until it contacts the stop element 96. When the wash apparatus 18 is driven in counterclockwise rotation, the wash elements 30 rotate opposite to the direction of arrow 98. Via the friction of the wash elements 30, the wash apparatus segment 26 can be rotated about the rotation axis 24 opposite to the direction of arrow 100.

In particular, an advantage of the wash apparatus 18 also lies in that no return device is required after pivoting a wash apparatus segment 26.

Figure 9:
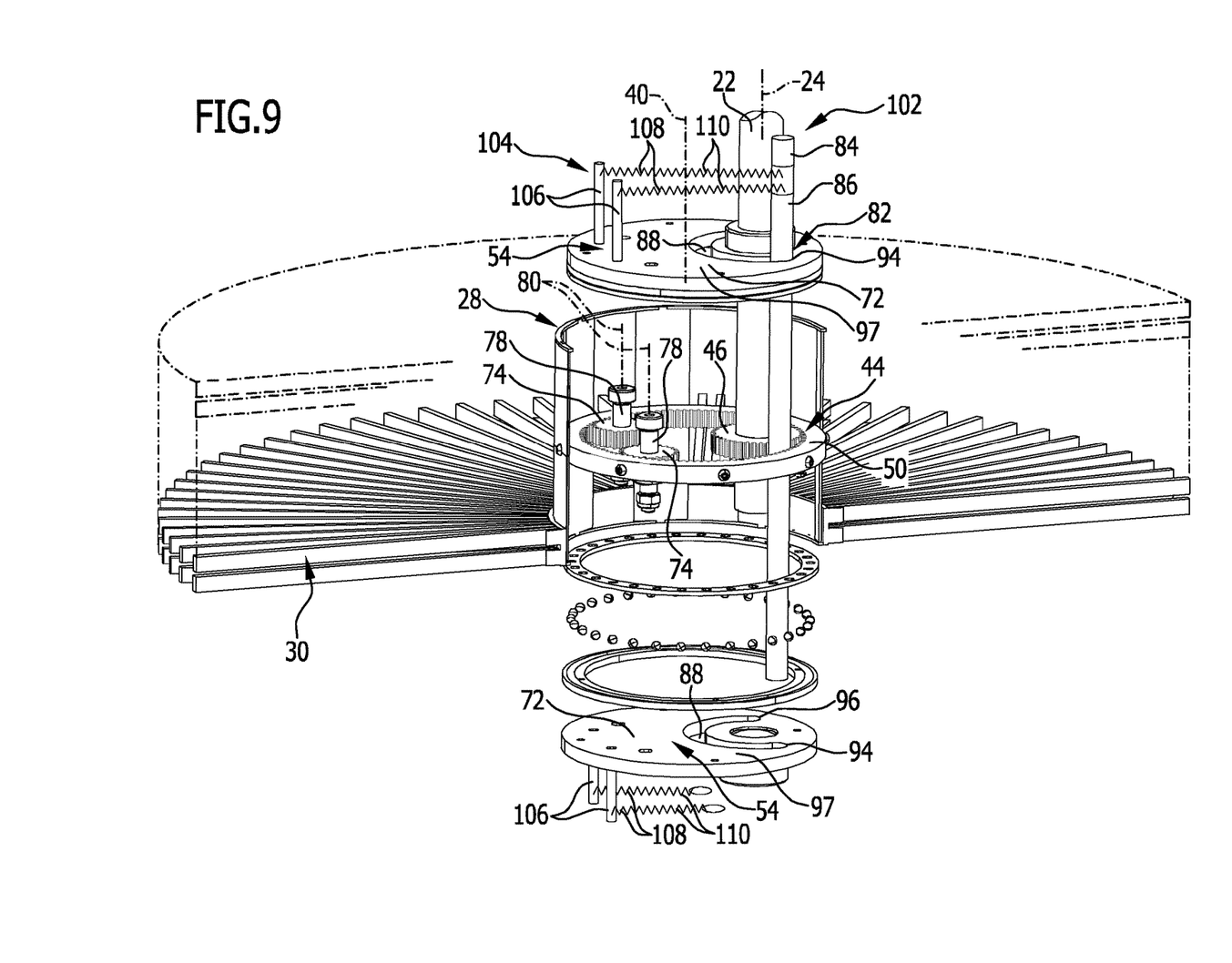
FIG. 9 is a view corresponding to FIG. 3 of a further preferred embodiment of a wash apparatus in accordance with the invention.

However, in a further advantageous embodiment, partially shown in FIG. 9, a return device is provided. Shown in FIG. 9 is a wash apparatus segment, designated by the reference numeral 102, of an advantageous embodiment of a wash apparatus in accordance with the invention, not shown in its entirety. The wash apparatus segment 102 could also be utilized in place of a wash apparatus segment 26 in a variation of the wash apparatus 18.

The same reference characters are used to denote identical or functionally equivalent features and components of the wash apparatus segments 26 and 102. The above-described advantages can also be achieved with use of the wash apparatus segment 102. Only the substantial differences therebetween will be described hereinafter.

In the wash apparatus segment 102, a return device 104 serves to bias the cover bodies 54 relative to the rod 86. To this end, each cover body 54 is provided with at least one, and preferably two, holding elements 106. A respective holding element 106 is engaged by an elastic element 108 which in the present case is configured as a coil spring 110. The coil spring 110 engages the rod 86 relative to which it is configured for rotational movement.

In the present case, the coil spring 110 is configured for operation under tension. Pivoting the wash apparatus segment 102 relative to the shaft 22 is against the return action of the coil spring 110. Providing two coil springs 110 enables the wash apparatus segment 102 to pivot back in both different directions of rotation (clockwise and counterclockwise).

REFERENCE SYMBOL LIST 10 vehicle wash installation
12 lateral beam
14 cross beam
16 holding device
18 wash apparatus
19 drive device
20 shaft
22 rotation axis
24 wash apparatus segment
26 wash element holding body
28 wash element
30 (small) car
32 contour
33 minibus
34 contour
36 contour line
38 shell
40 wash apparatus segment axis
42 collar
44 gear device
46 drive element
48 toothed wheel
50 rotary body
52 ring gear
54 cover body
56 bearing
58 bearing ring
60 bearing
62 sliding bearing
64 holding element
66 bearing
68 bearing ring
70 support surface
72 coupling body
74 engagement element
76 toothed wheel
78 shaft
80 rotation axis
82 stop device
84 blocking element
86 rod
88 through-opening
90 adjustment device
92 guide element
94 stop element
96 stop element
97 stop body
98 direction of arrow
100 direction of arrow
102 wash apparatus segment
104 return device
106 holding element
108 elastic element
110 coil spring

The invention claimed is:

1. A wash apparatus for a vehicle wash installation, which wash apparatus comprises a shaft drivable in rotation about a rotation axis and wash elements operatively connected thereto, for cleaning a vehicle, wherein the wash apparatus is divided axially in two or more wash apparatus segments and wherein at least one wash apparatus segment comprises a wash element holding body having wash elements held thereto, said wash element holding body defining a wash apparatus segment axis which is different from the rotation axis, and a gear device which couples the shaft to the wash element holding body in order to rotate same about the wash apparatus segment axis, wherein the wash element holding body is configured for pivotal movement relative to the shaft via the gear device;
wherein the gear device comprises a drive element that is connected to the shaft in rotationally fixed relation therewith and a rotary body to which the wash element holding body is held in rotationally fixed relation or which forms the wash element holding body, wherein the rotary body is in engagement with the drive element; and
wherein the gear device comprises at least one cover body which at least partially covers the rotary body and the drive element in a direction transverse to the wash apparatus segment axis.

2. The wash apparatus in accordance with claim 1, wherein the wash element holding body is configured for pivotal movement relative to the shaft about the rotation axis via the gear device.

3. The wash apparatus in accordance with claim 1, wherein the rotary body is a ring gear and the drive element is a roller that rolls on the inside of the ring gear or wherein the rotary body is an internally toothed ring gear and the drive element is a toothed wheel meshing with the ring gear.

4. The wash apparatus in accordance with claim 3, wherein the gear device comprises at least one engagement element configured as a toothed wheel or roller which rolls on the ring gear and at least one coupling body on which is rotatably supported at least one engagement element and which is supported for rotary movement on the shaft.

5. The wash apparatus in accordance with claim 4, wherein two engagement elements are provided, each of which is rotatably supported on at least one coupling body.

6. The wash apparatus in accordance with claim 4, wherein two coupling bodies are provided that are axially arranged on sides of the rotary body and the at least one engagement element facing away from each other.

7. The wash apparatus in accordance with claim 4, wherein the gear device comprises at least one cover body which at least partially covers the rotary body and the drive element in a direction transverse to the wash apparatus segment axis, the at least one cover body comprising or forming the at least one coupling body.

8. The wash apparatus in accordance with claim 1, wherein the gear device comprises two cover bodies which are arranged axially on sides of the rotary body and the drive element facing away from each other.

9. The wash apparatus in accordance with claim 1, wherein the at least one cover body is plate-shaped or substantially plate-shaped.

10. The wash apparatus in accordance with claim 1, wherein the at least one cover body is configured for rotary movement relative to the shaft, and wherein the gear device comprises a bearing via which the at least one cover body is rotatably supported on the shaft.

11. The wash apparatus in accordance with claim 1, wherein the at least one cover body is coupled to the rotary body in friction-locking relation therewith for rotation about the wash apparatus segment axis.

12. The wash apparatus in accordance with claim 11, wherein the at least one cover body is configured for rotary movement relative to the rotary body, and wherein the gear device comprises a bearing via which the at least one cover body is rotatably supported on the rotary body.

13. The wash apparatus in accordance with claim 1, wherein the wash element holding body surrounds the gear device in a circumferential direction of the wash apparatus segment axis.

14. The wash apparatus in accordance with claim 1, wherein the wash apparatus segment comprises a stop device for limiting a pivot angle of the wash element holding body relative to the shaft in at least one pivoting direction.

15. The wash apparatus in accordance with claim 14, wherein the stop device comprises at least one stop element which is configured for rotary movement relative to the rotary body and is coupled to the rotary body by friction-locking engagement, and at least one blocking element cooperating with the at least one stop element, said blocking element being arranged stationary relative to the shaft.

16. The wash apparatus in accordance with claim 15, wherein the stop device comprises two stop elements, wherein pivoting of the wash element holding body in a respective pivoting direction is limitable by a respective stop element.

17. The wash apparatus in accordance with claim 15, wherein, depending on the pivoting direction, the same blocking element cooperates with a respective one of the two stop elements, for limiting the pivot angle.

18. The wash apparatus in accordance with claim 15, wherein the stop device comprises a stop body which comprises both of the stop elements.

19. The wash apparatus in accordance with claim 18, wherein the stop body comprises or forms a guide element through which the at least one blocking element is guided when pivoting the wash element holding body.

20. The wash apparatus in accordance with claim 18, wherein the gear device comprises at least one cover body which at least partially covers a rotary body and a drive element of the gear device in a direction transverse to the wash apparatus segment axis, the at least one cover body comprising or forming the at least one stop body.

21. The wash apparatus in accordance with claim 15, wherein a common blocking element is provided that cooperates with the respective at least one stop element of two or more wash apparatus segments.

22. The wash apparatus in accordance with claim 15, wherein the at least one blocking element is adjustable relative to the at least one stop element by way of an adjustment device.

23. The wash apparatus in accordance with claim 15, wherein the at least one blocking element is elongated and is oriented parallel to the shaft.

24. The wash apparatus in accordance with claim 15, wherein the at least one stop element is rotatably supported on the rotary body via a bearing.

25. The wash apparatus in accordance with claim 1, wherein the wash element holding body is pivotable relative to the shaft against the action of at least one elastic element.

26. The wash apparatus in accordance with claim 25, wherein the wash apparatus segment comprises a stop device for limiting a pivot angle of the wash element holding body relative to the shaft in at least one pivoting direction, the stop device comprising at least one stop element and at least one blocking element cooperating with the at least one stop element, said blocking element being arranged stationary relative to the shaft, the at least one elastic element is a spring element which biases the at least one stop element relative to the at least one blocking element.

27. The wash apparatus in accordance with claim 1, wherein the shaft is of rigid configuration and straight-line extension.

28. The wash apparatus in accordance with claim 1, wherein each wash apparatus segment comprises a wash element holding body and a gear device.

29. The wash apparatus in accordance with claim 28, wherein the wash element holding bodies of the wash apparatus segments are drivable and pivotable relative to the shaft independently of each other.

30. The wash apparatus in accordance with claim 28, wherein the wash apparatus segments are of identical configuration.

31. The wash apparatus in accordance with claim 28, wherein the wash apparatus comprises at least three wash apparatus segments.

32. The wash apparatus in accordance with claim 1, wherein the wash elements are wash bristles or wash cloths.

33. The wash apparatus in accordance with claim 1, wherein the wash apparatus is a side wash apparatus or a roof wash apparatus.

34. A vehicle wash installation, comprising at least one wash apparatus, the wash apparatus comprising a shaft drivable in rotation about a rotation axis and wash elements operatively connected thereto, for cleaning a vehicle, wherein the wash apparatus is divided axially in two or more wash apparatus segments and wherein at least one wash apparatus segment comprises a wash element holding body having wash elements held thereto, said wash element holding body defining a wash apparatus segment axis which is different from the rotation axis, and a gear device which couples the shaft to the wash element holding body in order to rotate same about the wash apparatus segment axis, wherein the wash element holding body is configured for pivotal movement relative to the shaft via the gear device;

wherein the gear device comprises a drive element that is connected to the shaft in rotationally fixed relation therewith and a rotary body to which the wash element holding body is held in rotationally fixed relation or which forms the wash element holding body, wherein the rotary body is in engagement with the drive element; and     wherein the gear device comprises at least one cover body which at least partially covers the rotary body and the drive element in a direction transverse to the wash apparatus segment axis.

35. A wash apparatus for a vehicle wash installation, which wash apparatus comprises a shaft drivable in rotation about a rotation axis and wash elements operatively connected thereto, for cleaning a vehicle, wherein the wash apparatus is divided axially in two or more wash apparatus segments and wherein at least one wash apparatus segment comprises a wash element holding body having wash elements held thereto, said wash element holding body defining a wash apparatus segment axis which is different from the rotation axis, and a gear device which couples the shaft to the wash element holding body in order to rotate same about the wash apparatus segment axis, wherein the wash element holding body is configured for pivotal movement relative to the shaft via the gear device;

wherein the gear device comprises a drive element that is connected to the shaft in rotationally fixed relation therewith and a rotary body to which the wash element holding body is held in rotationally fixed relation or which forms the wash element holding body, wherein the rotary body is in engagement with the drive element;

wherein the rotary body is a ring gear and the drive element is a roller that rolls on the inside of the ring gear or wherein the rotary body is an internally toothed ring gear and the drive element is a toothed wheel meshing with the ring gear;

wherein the gear device comprises at least one engagement element configured as a toothed wheel or roller which rolls on the ring gear and at least one coupling body on which is rotatably supported at least one engagement element and which is supported for rotary movement on the shaft; and     wherein two coupling bodies are provided that are axially arranged on sides of the rotary body and the at least one engagement element facing away from each other.

36. A wash apparatus for a vehicle wash installation, which wash apparatus comprises a shaft drivable in rotation about a rotation axis and wash elements operatively connected thereto, for cleaning a vehicle, wherein the wash apparatus is divided axially in two or more wash apparatus segments and wherein at least one wash apparatus segment comprises a wash element holding body having wash elements held thereto, said wash element holding body defining a wash apparatus segment axis which is different from the rotation axis, and a gear device which couples the shaft to the wash element holding body in order to rotate same about the wash apparatus segment axis, wherein the wash element holding body is configured for pivotal movement relative to the shaft via the gear device;

wherein the wash apparatus segment comprises a stop device for limiting a pivot angle of the wash element holding body relative to the shaft in at least one pivoting direction; and     wherein the stop device comprises at least one stop element which is configured for rotary movement relative to the rotary body and is coupled to the rotary body by friction-locking engagement, and at least one blocking element cooperating with the at least one stop element, said blocking element being arranged stationary relative to the shaft.

\* \* \* \* \*

UNITED STATES PATENT AND TRADEMARK OFFICE
CERTIFICATE OF CORRECTION

PATENT NO. : 10,266,157 B2
APPLICATION NO. : 15/863451
DATED : April 23, 2019
INVENTOR(S) : Haberl Page 1 of 1

It is certified that error appears in the above-identified patent and that said Letters Patent is hereby corrected as shown below:

In the Specification

At Column 13, Line 52, the text "19 drive device" should be changed to -- 20 drive device --

At Column 13, Line 53, the text "20 shaft" should be changed to -- 22 shaft --

At Column 13, Line 54, the text "22 rotation axis" should be changed to -- 24 rotation axis --

At Column 13, Line 55, the text "24 wash apparatus segment" should be changed to
-- 26 wash apparatus segment --

At Column 13, Line 56, the text "26 wash element holding body" should be changed to
-- 28 wash element holding body --

At Column 13, Line 57, the text "28 wash element" should be changed to -- 30 wash element --

At Column 13, Line 58, the text "30 (small) car" should be changed to -- 32 (small) car --

At Column 13, Line 59, the text "32 contour" should be changed to -- 33 contour --

At Column 13, Line 60, the text "33 minibus" should be changed to -- 34 minibus --

At Column 13, Line 61, the text "34 contour" should be changed to -- 35 contour --

Signed and Sealed this
Seventh Day of July, 2020

Andrei Iancu
*Director of the United States Patent and Trademark Office*